United States Patent
Yates

[11] Patent Number: 5,993,584
[45] Date of Patent: *Nov. 30, 1999

[54] SEAMLESS GEL CUSHION METHOD OF MANUFACTURE

[76] Inventor: Paul M. Yates, 5814 Briar Tree Dr., La Canada, Calif. 91011

[*] Notice: This patent is subject to a terminal disclaimer.

[21] Appl. No.: 08/652,714

[22] Filed: May 30, 1996

[51] Int. Cl.⁶ ..................................................... A63B 39/00
[52] U.S. Cl. .......................... 156/145; 156/212; 156/242; 156/245; 156/285
[58] Field of Search ..................................... 156/212, 242, 156/244.12, 244.21, 244.23, 244.24, 245, 229, 311, 145, 285; 264/327, 556

[56] References Cited

U.S. PATENT DOCUMENTS

| | | | |
|---|---|---|---|
| 4,456,642 | 6/1984 | Burgdorfer et al. | 428/68 |
| 5,340,352 | 8/1994 | Nakanishi et al. | 450/59 |
| 5,497,789 | 3/1996 | Zook | 128/893 |
| 5,679,193 | 10/1997 | Yates | 156/145 |

FOREIGN PATENT DOCUMENTS 63-319113  12/1988  Japan .

Primary Examiner—Elizabeth M. Cole
Attorney, Agent, or Firm—Walter A. Hackler

[57] ABSTRACT

A gel cushion, and a method of manufacturing same, in accordance with the present invention generally includes the steps of cooling a mold to a selected temperature, disposing a porous stretchable fabric over the cooled mold, depositing a volumes of gelable liquid within the mold such that the cooled mold enables pores of the fabric to fill with gel without penetration therethrough, applying a vacuum between the fabric and the mold, allowing the gel to set and solidify and removing the solidified gel having the fabric fixed thereto in order to obtain the gel cushion. Another embodiment of the invention includes the step of filling a second matching mold and bonding the two volumes of gelable liquid together in order to make a fabric enclosed gel cushion. Yet another embodiment of the invention includes the step of depositing air filled bags or balloons on the coated fabric prior to injecting the additional gel in order to make a gel cushion having voids therein.

13 Claims, 3 Drawing Sheets

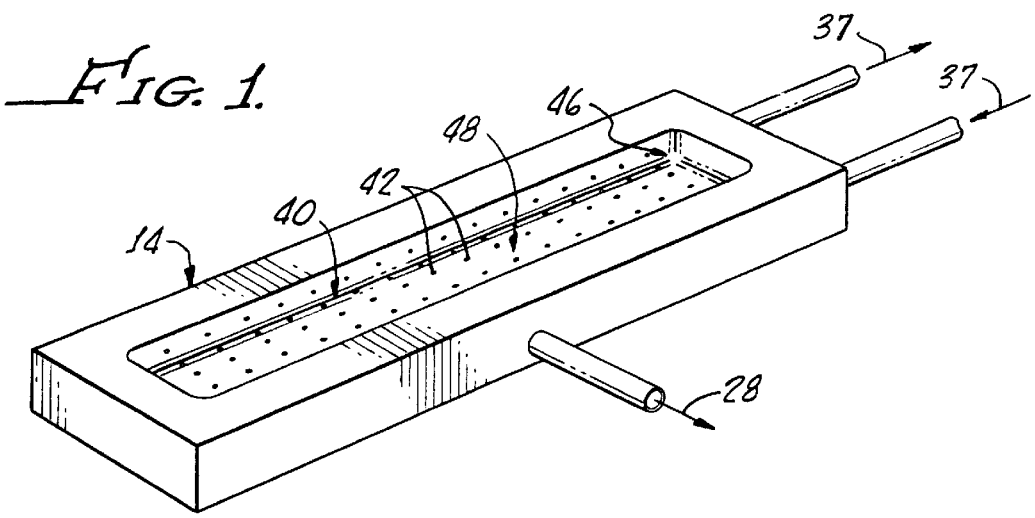
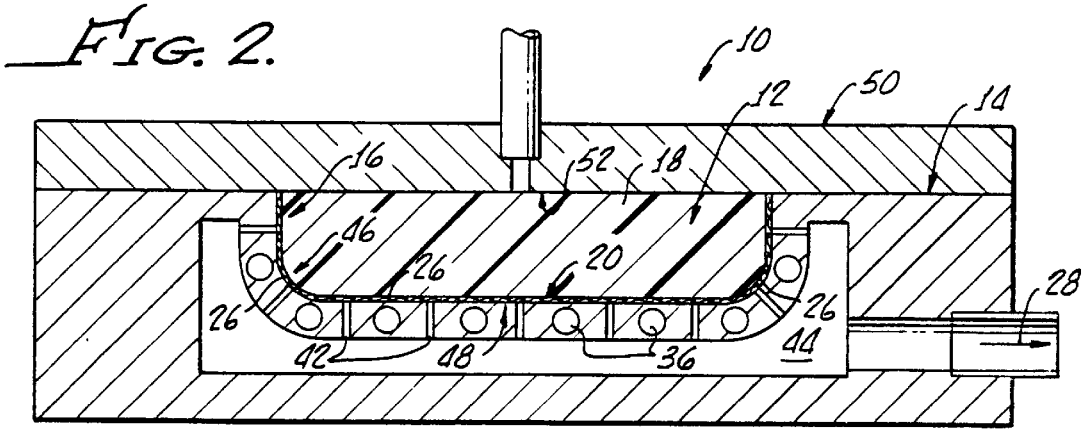
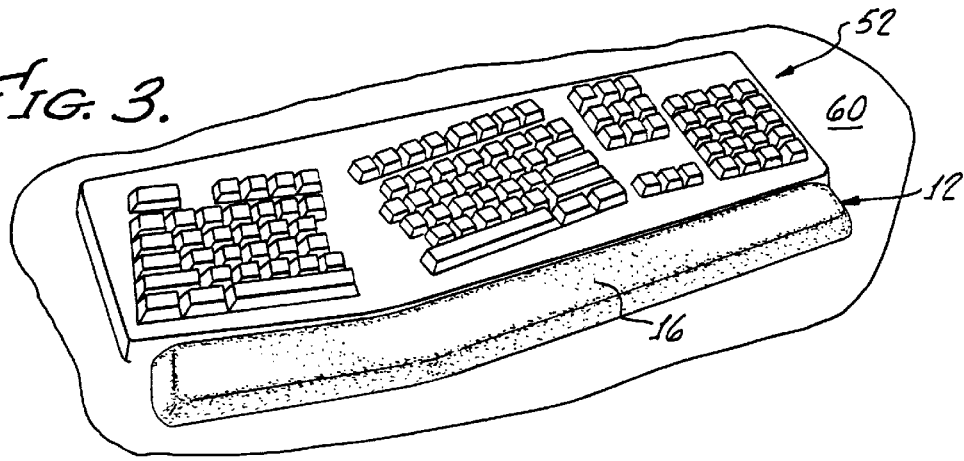

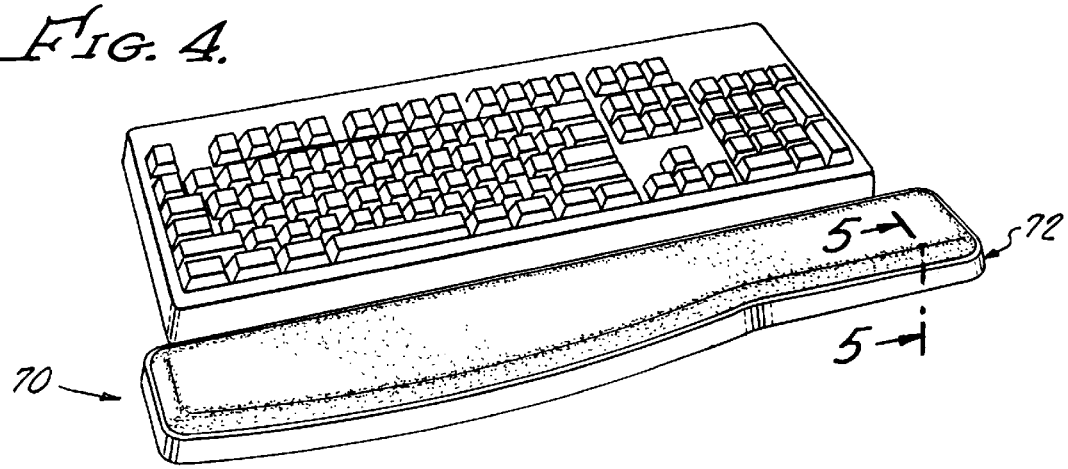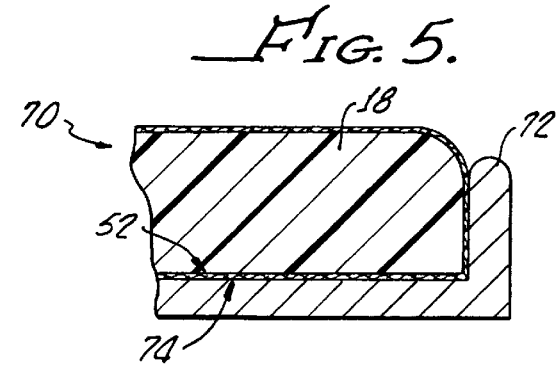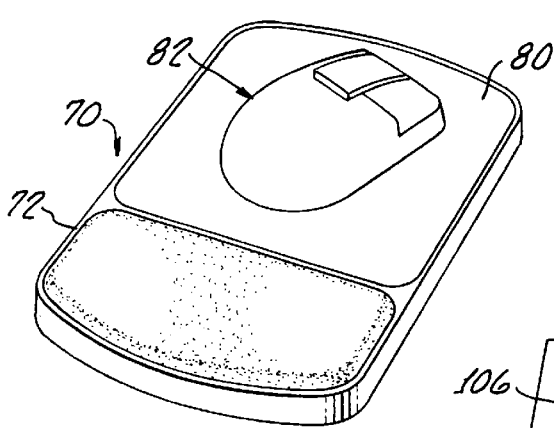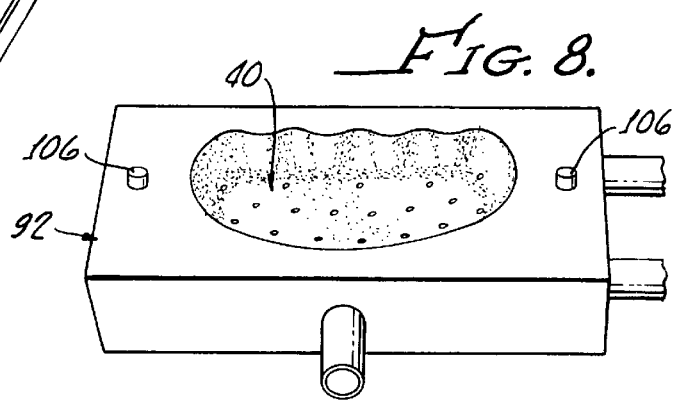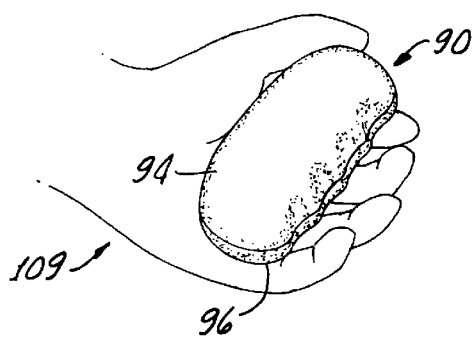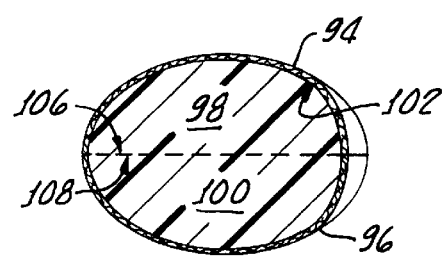

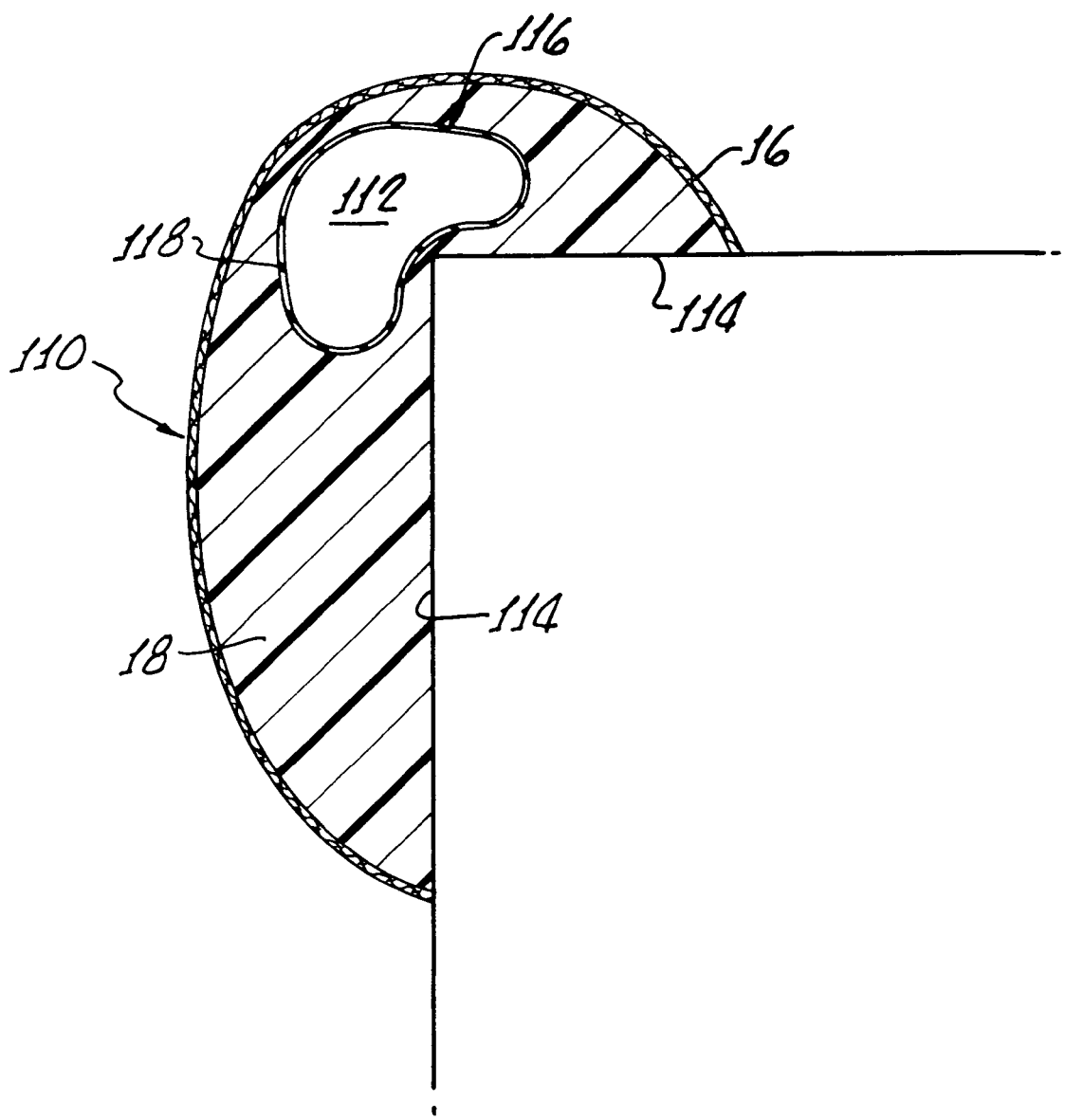

SEAMLESS GEL CUSHION METHOD OF MANUFACTURE

The present invention generally relates to a method of making gel cushions, and more particularly relates to both a method of making seamless, vacuum-molded, wrist support gel cushions, and gel cushions manufactured by such a method.

A recent surge in the number of wrist and arm occupational injuries, resulting from repetitive computer keyboard use, has prompted the development of countless devices directed at alleviating this modern problem. "Carpal Tunnel Syndrome" has become a well known term describing a group of symptoms, including tendinitis, and epicondylitis, that occurs as a result of repetitive flexion of the wrist joints. Not only are the symtoms of Carpal Tunnel Syndrome extremely painful, they have the potential to be permanently debilitating. Fortunately, it has been found that if the causes of the disease are minimized or eliminated in time, further damage therefrom may be averted.

Wrist wraps, directed at immobilizing the wrist joint, and wrist supports, directed at propping the hand at a position which minimizes repetitive wrist flexion, have been heretofore developed. These devices are used extensively by data entry personnel and other keyboard operators in order to prevent wrist and arm injuries.

The present invention is directed at an inexpensive method for manufacturing gel cushions that may be used as highly effective, comfortable wrist supports. In a broad sense, the method may be used to produce gel cushions for other uses.

Some prior art wrist supports, though designed to minimize repetitive wrist flexion, tend to be uncomfortable to use after a period of time. Notably, because such devices are typically positioned for supporting the underside of a user's wrist, flow of blood may be impeded by the use of rigid, non-yielding material.

Thus, a number of prior art wrist supports are comprised of softer, more comfortable materials, such as foam rubber. Unfortunately, the resiliency of foam rubber, and other similar cellular materials, tends to diminish after extended periods of use. Furthermore, foam rubber tends to wear unevenly, resulting in hardened areas where compression is most regularly applied. Thus, foam rubber supports become less comfortable with time, necessitating frequent replacement thereof.

Cushioning devices having liquid or gel filled bladders have been developed in the attempt to provide a more comfortable, more durable support for the wrist than is possible with solid or foam rubber supports. For example, U.S. Pat. No. 5,435,503 discloses a wrist rest support comprising a viscous, fluid-filled bladder removably inserted in a machine washable outer covering.

This prior art device, and others which are similar thereto, are manufactured by several independent steps, including sewing or other means of assembling the bladder, filling the bladder with the desired liquid, sealing the bladder such that it will resist leakage, and fashioning an outer covering in which to enclose the liquid filled bladder.

The present invention provides a substantially less complicated process for manufacturing a comfortable fabric covered cushion that includes all the advantages of a liquid support medium. Although the method of the present invention produces a fabric covered gel-cushion, no sewing, filling, sealing or gluing is required in the process of making the cushion.

Notably, because a gel cushion manufactured in accordance with the present invention does not include a fluid filled bladder, there is no possibility that jewelry worn by the operator will rupture the cushion and cause leakage of its contents.

Furthermore, a gel cushion in accordance with the present invention is seamless due to the unique method of manufacturing same, thus eliminating the possibility of the cushion snagging delicate fabrics that may be worn by the keyboard operator.

A gel cushion made in accordance with the method of the present invention will adhere to any typical surface on which it is placed, for example, a desktop. This eliminates potential frustration suffered by a keyboard operator who must contend with a wrist support that migrates and slips along the desktop due to the natural movement of the operator's hand and arm. Notably, the gel cushion requires no additional components to affix, clamp or secure the cushion to a surface. The cushion may be quickly and easily removed, and its position readjusted as desired, when being used by more than one user.

Alternatively, the gel cushion may be used in combination with a support tray, or the like. This is particularly useful when the gel cushion is used in conjunction with a mouse pad. In particular, the gel cushion may be disposed in a tray which includes a conventional computer mouse pad, such that during operator control of a computer mouse, the wrist support remains fixed in a spaced apart relationship with the mouse pad.

Overall, the present inventor provides an inexpensive method of manufacturing a comfortable, durable gel cushion.

SUMMARY OF THE INVENTION

A method for manufacturing a gel cushion, in accordance with the present invention, generally comprises the steps of cooling a mold to a selected temperature; disposing a stretchable, porous fabric over the cooled mold; depositing a volume of gelable liquid into the mold onto an exposed side of the porous fabric, the gelable liquid entering pores of the fabric and the cooled mold preventing penetration of the porous fabric by causing the liquid to gelate in the pores; applying a vacuum between the fabric and the mold; allowing the remainder of the volume of gel to gelate in the mold; and removing the gel cushion, having the fabric fixed thereto, from the mold.

The gelable liquid is preferable a thermoelastic compound which has low fluid viscosity at elevated temperatures.

The method described herein is an improvement over the method described in my copending patent application, entitled "Gel Cushion and Method of Manufacture", Ser. No. 08/652,692, filed on even date herewith, which requires the additional step of first coating the porous stretchable fabric with gel in order to enable vacuum forming thereof.

Importantly, the step of cooling the mold prior to disposing liquified gel onto the fabric disposed in the mold renders the fabric resistant to the passage of both air and gel therethrough, which enables the vacuum forming of the fabric and produces a gel cushion having a clean fabric covering.

More particularly, when said gelable liquid is poured or injected onto an exposed side of the fabric, the liquid rapidly enters pores of the fabric, due to the applied vacuum which naturally stretches apart fabric fibers and pulls air and liquid therebetween. However, the cooled mold prevents the vacuum from pulling the liquid through the pores of the fabric by causing rapid gelation and freezing off of the liquid within the pores. Consequently, the fabric covering of the final product is not stained by gel, but instead has an attractive, clean appearance, and is not tacky or sticky to the touch.

The cooling of the mold may be accomplished in any suitable manner. Preferably, however, the cooling includes the step of passing a cold liquid through channels or bores in the mold, and circulating the liquid such that the temperature of the mold remains substantially constant. Preferably, the selected temperature of the mold is between about 40 degrees Fahrenheit and about 50 degrees Fahrenheit. However, this may vary depending upon the temperature and composition of the gelable liquid utilized. The cold liquid may comprise, simply, cool water having a temperature of about the selected temperature.

Preferably, the step of applying the vacuum is performed before and during the step of depositing the gelable liquid. By applying the vacuum to the porous fabric before depositing the gelable liquid, the final gel cushion will maintain various surface contours, such as corners, or the like.

The vacuum naturally stretches apart fabric fibers and enlarges the pores, or the interstices between said fibers. The pores will have varying expansion over curved portions of the mold, and more uniform expansion over flat portions of the mold.

During the depositing step, the enlarged pores become filled with gelable liquid which rapidly solidifies, or gelates, within the expanded pores. Upon removal of the gel cushion from the mold, the surface contours are maintained and supported by the gel in the expanded pores.

A remainder of the gelable liquid is allowed to gelate during the cooling and vacuuming steps. Finally, the gel, having the fabric fixed thereto, is removed from the mold. Because liquid gel has not penetrated the fabric and contaminated surfaces of the mold, the mold may be immediately used for the subsequent manufacturing of another gel cushion.

The gel cushion may now be used as a wrist rest or other cushion device having a fabric upper surface and an adhesive lower surface comprised of exposed, tacky gel. the adhesive surface enables the gel cushion to be removably attached to a desk or other work surface, and easily peeled therefrom if repositioning is desired.

Another embodiment of the present invention includes, in addition to the steps hereinabove described, a neoprene backing may be applied to the exposed tacky gel and thereafter the gel cushion may be disposed in a rigid support, for example a plastic tray.

The tray provides means for supporting the gel cushion in a rigid fashion and facilitates rapid repositioning thereof. In other words, the gel cushion of this embodiment may be repositioned on a desk or other surface by simply moving the tray, rather than peeling the gel cushion as described above. In this regard, the rigid tray may be adjustable for customized height and tilt positioning of the wrist support.

Yet another embodiment of the present invention further comprises the steps of utilizing a second mold, disposing stretchable, porous fabric therein, depositing a second volume of gelable liquid, and vacuum forming as described above. In addition, the method includes the step of pressing both gel-filled molds together while the volumes of warm liquid are allowed to gelate. Thus, the volumes of liquid become bonded together, producing a unitary gel structure enclosed in stretchable fabric.

The method of the present invention may include the steps of removing extraneous portions of gel along edges of the filled mold, in order to produce a smooth, attractive gel cushion, by pressing a mat against the filled mold in order to sever extraneous gel from the gel cushion.

In addition, the gel cushion may be produced with air pockets, or voids, within the solidified gel in order to increase softness of the cushion as well as enable the cushion to adhere to angled surfaces. Particularly, air filled balloons, or hollow bags, made of gel or other flexible material may be placed in the mold prior to the depositing of the gelable liquid in the mold such that the completed gel cushion will include air pockets formed by the balloons.

Although the present invention is well suited for producing gel cushions to be used as comfortable wrist supports, it should be appreciated that the invention may be utilized to produce other cushion forms as well. Furthermore, the present invention encompasses a gel cushion made in accordance with the methods briefly described hereinabove.

BRIEF DESCRIPTION OF THE DRAWINGS

The present invention may be more clearly understood with reference to the following detailed description, in conjunction with the appended drawings of which:

FIG. 1 shows apparatus suitable for practicing a method for manufacturing a gel cushion in accordance with the present invention;

FIG. 2 shows a cross sectional view of the apparatus shown in FIG. 1;

FIG. 3 shows the gel cushion in accordance with the present invention, manufactured using the apparatus of FIG. 1, functioning as a wrist support for an economic keyboard;

FIGS. 4 and 5 show two additional types of wrist support gel cushions produced by the method of the present invention, each of these including a rigid support tray;

FIG. 6 shows a cross sectional view of the wrist support gel cushion taken along line 6—6 of FIG. 4.

FIG. 7 shows another embodiment of the present invention, particularly a fabric enclosed gel cushion;

FIG. 8 shows apparatus suitable for manufacturing the fabric enclosed gel cushion shown in FIG. 7;

FIG. 9 shows a cross-sectional view of the fabric enclosed gel cushion shown in FIG. 7; and FIG. 10 shows a cross sectional view of a gel cushion having a void therein for enabling bending of the gel cushion about an angled surface.

DETAILED DESCRIPTION

Turning now to FIGS. 1 and 2, an apparatus 10 suitable for manufacturing a gel cushion 12 in accordance with the method of the present invention is shown.

The method generally comprises the steps of cooling a mold 14 to a selected temperature; disposing a stretchable, porous fabric 16 over the cooled mold 14; depositing a volume of gelable liquid 18 into the mold 14 onto an exposed side 20 of the porous fabric 16, said gelable liquid entering pores 26 of the porous fabric 16 and said cooled mold 14 preventing penetration of the gelable liquid 18 through the fabric 16 by causing gelation of the gelable liquid 18 within said pores 26; applying a vacuum (represented by arrow 28) between the fabric 16 and the mold 14 in order to cause the fabric 16 to be stretched and vacuum formed; allowing a remainder 30 of the volume of gelable liquid 18 to gelate in the mold 14; and removing the gel 13 and the vacuum formed fabric 16 fixed thereto from the mold 14 in order to obtain a gel cushion 12.

It should be appreciated that the present invention also includes a gel cushion 12 made in accordance with the method described in detail herein.

The cooling of the mold 14 may be accomplished in any suitable manner. Preferably, in order to maintain substantially constant the selected temperature of the mold, the cooling may include the step of passing a cool liquid, for example water, through bores 36 in the mold 14. The cooling liquid may for example have a circulating flow path (represented by arrows 40).

The porous fabric 16 may be, for example, a two or four way stretch fabric, made of an elastomeric thread, preferably a segmented polyester-polyurethane, like that sold under the trade name "Lycra®", available from I.E. Dupont de Nemours and Company. It should be appreciated that many other types of porous, stretchable materials, including porous films, may be used in the method of the present invention.

As will be discussed in detail hereinafter, the method of the present invention enables the use of bare, stretchable fabrics 16 that include no coating or lamination thereon. Thus, the gel cushion 12 will have a comforting, fluid feel to the user, as the soft gel 18 is nearly in direct contact with the user's touch.

The gelable liquid 18 preferably comprises a soft, easily molded composition. More particularly, the gelable liquid may comprise a thermoplastic compound having low fluid viscosity at elevated temperatures that can be pored or injection molded, and thereafter cooled to produce a rubbery, elastic gel having a high surface friction, for example a suitable thermoplastic elastomer.

Preferably, the mold is cooled to a selected temperature of between about 40° F. and about 50° F., or less. Molding processing temperature of the gelable liquid 18 will depend upon the particular thermoplastic composition being used, but preferably within the range of about 300° F. to about 500° F., or more.

It has been found that when the mold temperature is maintained within said selected temperature range, rapid gelation occurs in the pores 26 of the fabric 16, thereby preventing penetration of the fabric by the remaining gelable liquid 30. In other words, the chilled mold 14 acts to freeze the hot liquid 18 at a point of which the liquid enters the pores 26 and adheres to the fabric 16, but not at a point of enabling penetration therethrough. The balance, or remaining portion 30, of the hot gelable liquid 18 will remain in a low viscosity state for a period sufficient to flow through and completely fill the mold 14.

At this point, the fabric 16 is no longer porous, and consequently, is vacuum moldable. Importantly, the fabric 16 retains stretchability, as the gel 18 within the pores 26 is highly elastic.

The mold 14, which includes selected contours 40 depending upon the desired shape of the final gel cushion 12, may be adapted for vacuum forming in any suitable, conventional manner. For example, the mold 14 may include vacuum ports 42 in communication with a hollowed cavity 44 in the mold 14 to which a vacuum may be applied. The vacuum molding enables smooth, intimate contact between the fabric 16 and the mold 14, producing an attractive, seamless fabric covered gel cushion 12.

The fabric 16 may be deposited in the mold 14 in any suitable manner. Preferably, however, the fabric 16 is placed within the mold 14, with edges of the fabric 16 suitably fastened thereto, in order to secure placement of the fabric 16 during the vacuuming step.

While the vacuum is being applied, and before gelable liquid is deposited in the mold 14, air will be forced through the fabric pores 26, i.e. the spaces between fibers (not shown) of the fabric 16. Some stretching of the fabric 16 may occur at this point, thus widening the pores 26. Thus, when the gelable liquid 18 is deposited on the vacuumed fabric, it will naturally flow into the enlarged pores 26, facilitated by suction from the vacuum.

Preferably, the step of applying the vacuum is performed before and during the step of depositing the gelable liquid 18. By applying the vacuum to the porous fabric 16 before depositing the gelable liquid 18, the final gel cushion 12 will maintain the various surface contours 40, such as corners 46, or the like.

The vacuum naturally stretches the fabric and enlarges the pores 26, or the interstices between said fibers. The pores 26 will have varying degrees of expansion over curved portions of the mold. For example, along concavely curved portions, such as the corners 46, the expansion of the pores 26 will tend to be increasing and larger than over flat portions 42 of the mold 14. This varying pore expansion over the contour 40 of the mold is shown in cross section in FIG. 2.

During the depositing step, the enlarged pores 26 become filled with gelable liquid 18 which rapidly solidifes, or gelates, within the enlarged pores 26. Upon removal of the gel cushion 12 from the mold 14, the surface contour 40 is maintained and supported by the gel 18 in the enlarged pores 26.

The opening, or expansion of the pores 26 due to the vacuuming enables greater fluid flow of liquified gel thereinto. Importantly, such pore expansion therefor provides for greater and more rapid cooling of the gel 18 in the pores 26 that are most expanded, due to closer proximity of the liquified gel 18 to the cooled mold 14, thus preventing fabric penetration even in areas where pores 26 are most expanded.

In this respect, the present invention also includes a gel cushion 12 comprising the stretchable fabric 16 with the selected contour 40, said stretchable fabric 16 having expanded pores 26 of varying expansion over curved portions of the stretchable fabric 16, and solidified gel 18 which provides means for supporting the fabric 16 in the selected contour 40 and for maintaining the varying expansion of the pores 26.

Normally, any liquid, including gelable liquid, so deposited on a porous fabric having an vacuum applied thereto, will quickly penetrate the fabric. Moreover, the liquid may enter the vacuum ports, cause clogging thereof and potentially, disable the vacuum system.

Importantly, the method of the present invention enables the liquid 18 to be pulled into the fabric pores 26 while preventing penetration therethrough. Without the step of cooling of the mold to the selected temperature, the benefits of utilizing a high temperature, low viscosity, liquified gel would not be realized (e.g. complete filling of the mold), as the final product 12 would be stained with tacky gel that had been forced through the fabric 16 while in its liquid state.

Notably, the gelable liquid tends to temporarily soften and relax the fabric 16 upon contact therewith, facilitating the vacuum molding thereof. Heat from the initial contact of the liquid 18 with the fabric 16 causes the fabric 16 to be heat formed. Thus, for example, even heavy gauge, porous fabrics may be used in the method of the present invention, as well as molds having substantial curvature. For the manufacturing of gel cushions 12 having increased comfort and softness however, thin stretchable fabrics may be preferred in order to provide a more direct gel feel to the user.

While the vacuum is being applied, the gelable liquid 13 is allowed to gelate in the mold 14. This step may be hastened by allowing the cool liquid to continue to pass through the mold 14 for a suitable time period after the gelable liquid 18 has been deposited. Circulation of the cool liquid aids in uniform heat removal and consequently prevents sink formations and other undesirable conditions in the finished product.

The step of removing, i.e. extruding, the fabric covered gel cushion 12 from the mold 14 may be accomplished in any suitable manner, for example, by pressing a mat 50 (shown in FIG. 2) against the tacky gel surface 52, lifting the mat 50 and peeling the cushion 12 therefrom. The gel 18 provides means for supporting the stretchable fabric in the selected contour 40 of the mold 14.

Effectively, the fabric 16 has been heat formed by the initial contact with the hot liquid 18 during the depositing step, and the shape retained by subsequent gelation of the liquid 18 within the fabric pores 26. This heat forming of the fabric 16 relieves the tendency of the fabric 16 to return to its original flat condition once removed from the mold 14.

Notably, because the gelable liquid 18 does not penetrate or seep through the fabric 16 during the molding process, the mold 14 and vacuum ports 42 are not contaminated by gel after the removal step, and consequently, the mold 14 may be immediately reused for manufacturing of another gel cushior.

Referring now to FIG. 3, the gel cushion 12 produced by the hereinabove described method, is shown as being used as a wrist rest for an operator (not shown) of an economic computer keyboard 58. The cushion 12 includes the smooth fabric covering 16 and removably adheres to a surface 60, such as a desktop, by means of the tacky gel surface 52 (on an underside of the cushion, so not shown in FIG. 3). As shown, the cushion 12 may adhered to the desktop 60 in a flexed position in order to conform to contours of the keyboard 58.

Another embodiment 70 of the present invention is shown in FIGS. 4, 5, and 6. In particular, the gel cushion 70 may include a tray 72 for supporting the gel cushion in a rigid fashion in order of facilitate positioning thereof. Preferably, in order to facilitate positioning in the tray 72 during the manufacturing of a gel cushion 70 in accordance with this embodiment, a flexible material 74, such as neoprene, is affixed to the tacky gel surface 52. The flexible material 74 may be affixed during the step of allowing the gelable liquid 18 to cool and gelate.

The gel cushion 70 of this embodiment may be slidably repositioned, and thus may be preferred by some keyboard operators. Furthermore, with proper components added thereto, as known in the art, the rigid tray 72 may be tilt and height adjustable for customization to a particular user.

Alternatively, as shown in FIG. 5, a tray 76 may be configured to include a mouse pad 80 therein. Thus, the gel cushion 70 functions as a wrist rest during use of a computer mouse 82, and maintains a comfortable alignment and position of an operator's wrist (not shown) with respect to the mouse pad 30.

FIGS. 7 shows yet another embodiment of the present invention, particularly, a fabric enclosed gel exercise cushion 90. In this embodiment, two matching molds, in other words, a first and a second mold, are used. An example of only the first 92 of two matching molds is shown in FIG. 8.

This embodiment comprises the steps described hereinabove whiten regard to the fabric, covered gel cushion 12 having a tacky lower gel surface (such as shown in FIG. 3). However, this embodiment includes the use of the two matching molds 92, rather than a single mold. Generally, after filling of both matching molds, the two gel cushions are bonded together to produce the fabric enclosed gel cushion 90, having a cross section as shown in FIG. 9.

More particularly, a method for manufacturing the fabric enclosed gel cushion 90 comprises the steps of cooling the first and second molds 92 to the selected temperature; disposing first and second stretchable, porous fabrics 94, 96 over the cooled molds 92; depositing a first volume 98 and a second volume 100 of gelable liquid into the molds 92 onto exposed sides 102, 104 of the porous fabrics 94, 96; applying a vacuum between the fabrics 94, 96 and the molds 92 in order to cause the fabrics 94, 96 to be stretched and vacuum formed; allowing a remainder of the volumes 98, 100 of gelable liquid to gelate; and bonding together the volumes of gelable liquid 98, 100 by causing contact therebetween during the step of allowing the first volume 98 (and/or the second volume 100) to gelate.

The bonding step may include the step of simply pressing the first mold 92 and second mold together in order to cause contact between exposed liquid gel surfaces 106, 108.

In order to ensure precise matching of the molds during the bonding step, nubs 106, or the like, may be provided on the first mold 92 for being received by properly positioned indents on the second mold (not shown).

Finally, the fabric enclosed gel cushion 90 is removed from the matching molds 92. As shown in FIG. 7, the fabric enclosed gel cushion 90 may be used as a exercising device, by manual squeezing thereof. The fabric covering 94, 96 is comfortable to the touch and the gel interior 98, 100 provides sufficient resistance for exercising the muscles of hand and arm 109.

Another feature of the present invention is shown in FIG. 10. In particular, a gel cushion 110, in accordance with this embodiment of the present invention, may include one or more voids 112, or air pockets, therein for enabling bending or flexing of the cushion 110 about an angled surface 114.

In the method of the present invention, a gel cushion 110 having one or more voids 112 therein includes, in addition to the steps described above regarding the embodiment shown in FIGS. 3–5, the step of positioning on the fabric 16 one or more hollow balloons, or bags 116, made of a flexible material, said positioning being performed before the step of allowing the gelable liquid to gelate in the mold (not shown in FIG. 10).

More particularly, the hollow bag 116 may be positioned in a desired manner upon fabric 16 before or during the step of depositing the gelable liquid 18, such that the hollow bag 116 becomes substantially surrounded by gelable liquid 18. The gelable liquid 18 is then allowed to cool and gelate as described above.

The hollow bag 116 is preferably comprised of a material capable of bonding with the gelable liquid 18. More particularly, the hollow bag 116 may be comprised of a gel of the same composition as the gelable liquid 18. In this case, preferably walls 118 of the bag 116 are sufficiently thick to resist perforation by melting upon contact with the hot gelable liquid 18. Air trapped inside the hollow bag 116 will temporarily expand due to the heat contained in the gelable liquid 18 surrounding the bag 116, but the resilience and elasticity of the bag walls 118 enable substantial expansion without bursting thereof.

As shown in FIG. 10, the volt 112 provides means for enabling the gel cushion 110 to be flexed, or bent, sharply around the angled surface 114, while maintaining an ability of the gel cushion 110 to adhere thereto. For example, the gel cushion 110 may be used as a safety bumper, or guard, on a corner of table, desk, computer, or the like. Without the void 112 therein, the gel cushion may tend to detach from the angled surface 114 due to the rubberiness of the gel 18.

The voids 112 formed in the gel cushion 110, by the hereinabove described method, also tend to enhance softness of the cushion 110, and thus may increase comfort of some persons using the cushion 110.

In this respect, it should be appreciated that such voids may be an added feature to the fabric enclosed gel cushion embodiment 90 described hereinabove and shown in FIGS. 7–9. Thus, hand exercising devices may be manufactured which offer different levels of resistance depending on volume or number of voids therein.

Although there has been hereinabove described a gel cushion and a method of manufacturing same, in accordance with the present invention, for the purposes of illustrating the manner in which the invention may be used to advantage, it will be appreciated that the invention is no limited thereto. Accordingly, any and all modifications, variations, or equivalent arrangements which may occur to those skilled in the art should be considered to be within the scope of the invention as defined in the appended claims.

What is claimed is:

1. A method for manufacturing a gel cushion, said method comprising the steps of:

cooling a mold to a selected temperature;

disposing a stretchable, porous fabric over the cooled mold;

depositing a volume of gelable liquid into the mold onto an exposed side of the porous fabric, said gelable liquid entering pores of the porous fabric and said cooled mold preventing penetration of the gelable liquid through the fabric by causing gelation of the gelable liquid within said pores;

applying a vacuum between the fabric and the mold in order to cause the fabric to be stretched and vacuum formed, the application of vacuum being performed during the step of depositing the volume of gelable liquid in order to maintain a surface contour of the gel cushion by causing expansion of the pores and filling of the expanded pores with the gelable liquid;

allowing a remainder of the volume of gelable liquid to gelate in the mold; and removing the gel and the vacuum formed fabric fixed thereto from the mold in order to obtain a gel cushion.

2. The method according to claim 1 wherein the step of cooling the mold includes the step of passing a cold liquid through the mold.

3. The method according to claim 2 wherein the cold liquid is water.

4. The method according to claim 1 wherein the selected temperature for the cooling of the mold is between about 40° F. and about 50° F.

5. The method according to claim 3 wherein the gelable liquid is deposited at a temperature of between about 300° F. and about 500° F.

6. The method according to claim 1 further comprising the steps of:

first, cooling a second mold to the selected temperataure;

thereafter disposing a second stretchable, porous fabric over the cooled second mold;

thereafter depositing a second volume of gelable liquid into the second mold onto an exposed site of the second porous fabric, said gelable liquid entering pores of the second fabric and said cooled second mold preventing penetration of the gelable liquid through the fabric by causing gelation of the gelable liquid within said pores;

applying a vacuum between the second fabric and the second mold in order to cause the second fabric to be stretched and vacuum formed;

thereafter allowing a remainder of the second volume of gelable liquid to gelate in the second mold; and thereafter bonding the volumes of gelable liquid together by causing contact therebetween during the step of allowing the remainder of the second volume to gelate.

7. A method for manufacturing a gel cushion, said method comprising the steps of:

first cooling a mold to a selected temperature;

thereafter disposing a stretchable, porous fabric over the cooled mold;

thereafter applying a vacuum between the fabric and the mold in order to expand pores of the fabric and cause intimate contact between the fabric and the mold;

thereafter depositing a volume of gelable liquid into the mold onto an exposed side of the porous fabric during the vacuuming thereof, the cooled mold causing gelation of the gelable liquid in the expanded pores of the fabric and preventing penetration therethrough;

thereafter allowing a remainder of the volume of gelable liquid to gelate in the mold; and thereafter removing the gel and the vacuum formed fabric fixed thereto from the mold in order to obtain a gel cushion.

8. The method according to claim 7 wherein the step of cooling the mold includes the step of passing a cold liquid through the mold.

9. The method according to claim 8 wherein the cold liquid is water.

10. The method according to claim 7 wherein the selected temperature for the cooling of the mold is between about 40° F. and about 50° F.

11. The method according to claim 10 wherein the gelable liquid is deposited at a temperature of between about 300° F. and about 500° F.

12. The method according to claim 7 further comprising the steps of:

first cooling a second mold to the selected temperature;

thereafter disposing a second stretchable, porous fabric over the cooled second mold;

thereafter applying a vacuum between the second fabric and the second mold in order to expand pores of the second fabric and cause intimate contact between the second fabric and the second mold;

thereafter depositing a second volume of gelable liquid into the second mold onto an exposed side of the second porous fabric during the vacuuming thereof, the cooled mold causing gelation of the gelable liquid in the expanded pores of the fabric to enable vacuum forming of the porous fabric;

thereafter allowing a remainder of the second volume of gelable liquid to gelate in the second mold; and thereafter bonding the volumes of gelable liquid together by causing contact therebetween during the step of allowing the remainder of the second volume to gelate.

13. A method for manufacturing a gel cushion, said method comprising the steps of:

disposing a stretchable, porous fabric over a mold;

depositing a volume of gelable liquid onto an exposed side of the porous fabric, said gelable liquid entering pores of the porous fabric;

preventing penetration of the gelable liquid through the fabric by cooling the mold in order to cause gelation of the gelable liquid within said pores;

applying a vacuum between the fabric and the mold in order to cause the fabric to be stretched and vacuum formed, the application of vacuum being performed during the step of depositing the volume of gelable liquid in order to maintain a surface contour of the gel cushion by causing expansion of the pores and filling of the exposed pores with the gelable liquid;

allowing a remainder of the volume of gelable liquid to gelate in the mold; and removing the gel and the vacuum formed fabric fixed thereto from the mold in order to obtain a gel cushion.

* * * * *